United States Patent [19]
Di Tirro

[11] 3,848,848
[45] Nov. 19, 1974

[54] FAIL SAFE APPARATUS FOR FLUID ACTUATED SYSTEMS

[76] Inventor: Domenic A. Di Tirro, 3139 Harriet Rd., Silver Lake, Ohio 44224

[22] Filed: Mar. 25, 1974

[21] Appl. No.: 454,369

[52] U.S. Cl.................... 251/31, 91/424, 137/556, 137/596.16
[51] Int. Cl............................................. F16k 11/24
[58] Field of Search............ 137/456, 625.6, 625.69, 137/625.66, 556, 553, 596, 596.16; 251/31, 26, 27; 91/424, 461

[56] References Cited
UNITED STATES PATENTS
1,791,613  2/1931  Clay...................................... 251/31

Primary Examiner—Martin P. Schwadron
Assistant Examiner—Robert J. Miller
Attorney, Agent, or Firm—Frederick K. Lacher

[57] ABSTRACT

A cutoff valve has a three-position differential spool with a center groove permitting fluid supply in a center position of the spool and lands at the sides of the center groove for cutting off fluid supply in the off-center positions. Fluid supply passages from position sensor valves are connected with chambers at opposite ends of the cutoff valve for communication of fluid pressure to the ends of the spool in response to movement of the position sensor valves. Springs at the ends of the cutoff valve provide centering of the differential spool and engage rings having flanges for restricting the movement of the springs and resisting movement of the spool out of the center position. Effective fluid pressure areas on the spool provide an unbalanced force to hold the spool in the off-center cutoff positions. This unbalanced force is increased by the telescopic engagement of the ends of the spool with posts projecting into the end chambers of the cutoff valve. Automatic resetting of the apparatus is provided by shutting off the fluid supply and venting the supply lines to the cutoff valve.

11 Claims, 8 Drawing Figures

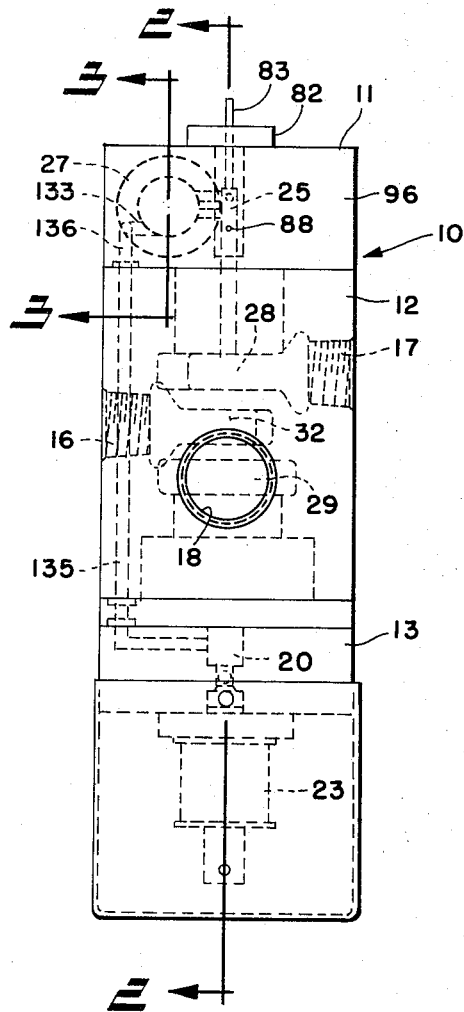
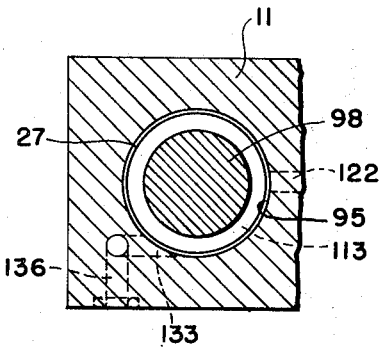
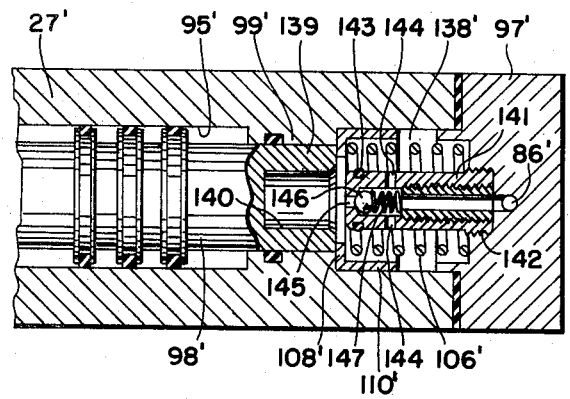
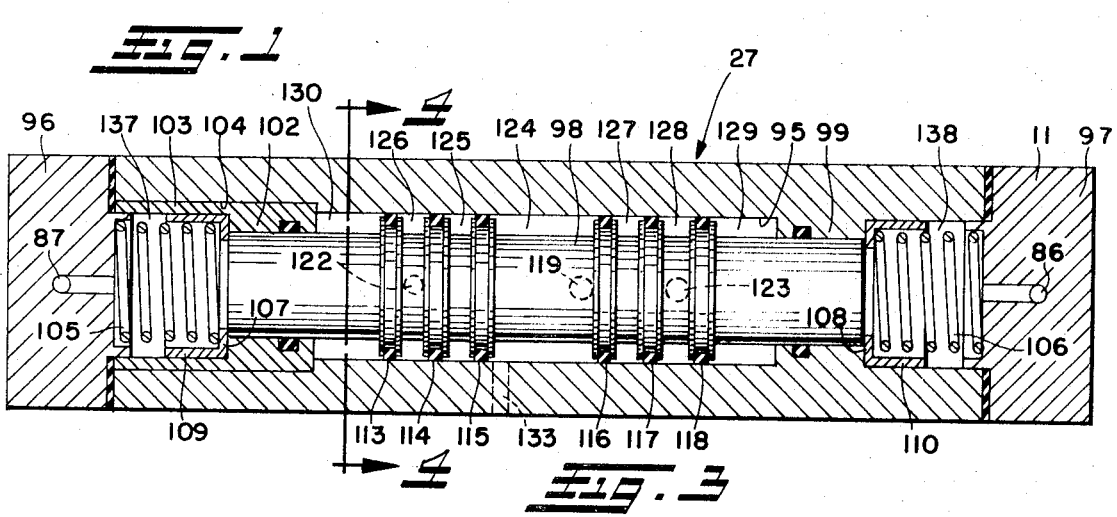

FAIL SAFE APPARATUS FOR FLUID ACTUATED SYSTEMS

BACKGROUND OF THE INVENTION

Control systems for fluid pressure actuated equipment such as pneumatic brakes and clutches have been devised to shut off the supply of fluid in case of failure of the control valves. These devices have utilized different types of electrically actuated shutoff valve systems. Also dual valve systems with a safety valve responsive to flow conditions at the control valves have been used.

The electrically actuated valve systems have not been entirely satisfactory because of the limited service life of the electromechanical switches and the relatively high cost of manufacture and repair of these systems. The dual valve system with a safety valve responsive to flow conditions or velocity of the fluid is limited to systems in which the dual main valves are in a parallel arrangement because the valve mechanism is so sensitive it cannot be set to operate with valves in series. The flow responsive system also requires a high degree of precision in manufacture and is susceptible to malfunction due to obstructions in the flow sensing passages.

The safety valves used with these systems have had opposing springs in engagement with opposite ends of a spool valve for centering of the spool in a mid position. It has been found however that centering of the spool is difficult because when the spool tends to move off center, both the springs continue to act on the spool and there is a zero spring load at mid position which does not provide the positive centering desired. Centering by opposing springs has also required careful matching of the springs.

Furthermore, special locking mechanisms have been required to lock the spool in the closed position. These mechanisms have required resetting and this has been difficult where the safety valve is located on machinery in remote, hard to reach positions. The mounting of this equipment in remote locations such as on top of large presses has also made it easier for operators to bypass the safety valve lock by wedging the locking mechanism in the open position without the knowledge of supervisors and thereby nullify the effectiveness of the safety features of the system.

SUMMARY OF THE INVENTION

The present invention provides solutions to the above problems in that position sensor valves are used and the dual main valves may be arranged in series or in parallel without adversely affecting the opperation of the system. Also the initial signal pressure from the position sensor valves to the safety valve can be either positive (above atmospheric pressure) or atmospheric (zero pressure gage). The safety valve also has a construction in which the opposing springs need not be precisely matched and there is a direct single spring rate resisting movement of the spool off center. Locking of the spool in a closed position is accomplished without a special locking mechanism and the possibility of an operator wedging the valve in the open position to bypass the safety operation is eliminated. Resetting of the safety valve may also be done from a position remote from the valve and therefore avoiding the difficulty of resetting the valve located in a hard to reach position.

BRIEF DESCRIPTION OF THE DRAWINGS

FIG. 1 is an elevation of the fluid pressure control and cutoff apparatus embodying the invention.

FIG. 3 is an enlarged sectional view taken along the plane of line 3—3 in FIG. 1 showing the safety valve in a centered open position.

FIG. 4 is a fragmentary sectional view taken along the plane of line 4—4 of FIG. 3 with parts being broken away.

FIG. 7 is a sectional view like FIG. 3 of a modified locking apparatus for the safety valve with parts being broken away to show the construction of the spool at one end of the safety valve.

FIG. 8 is a sectional view like FIG. 2 showing a further modification in which the main valve assemblies are connected in series.

DETAILED DESCRIPTION

Figure 2:
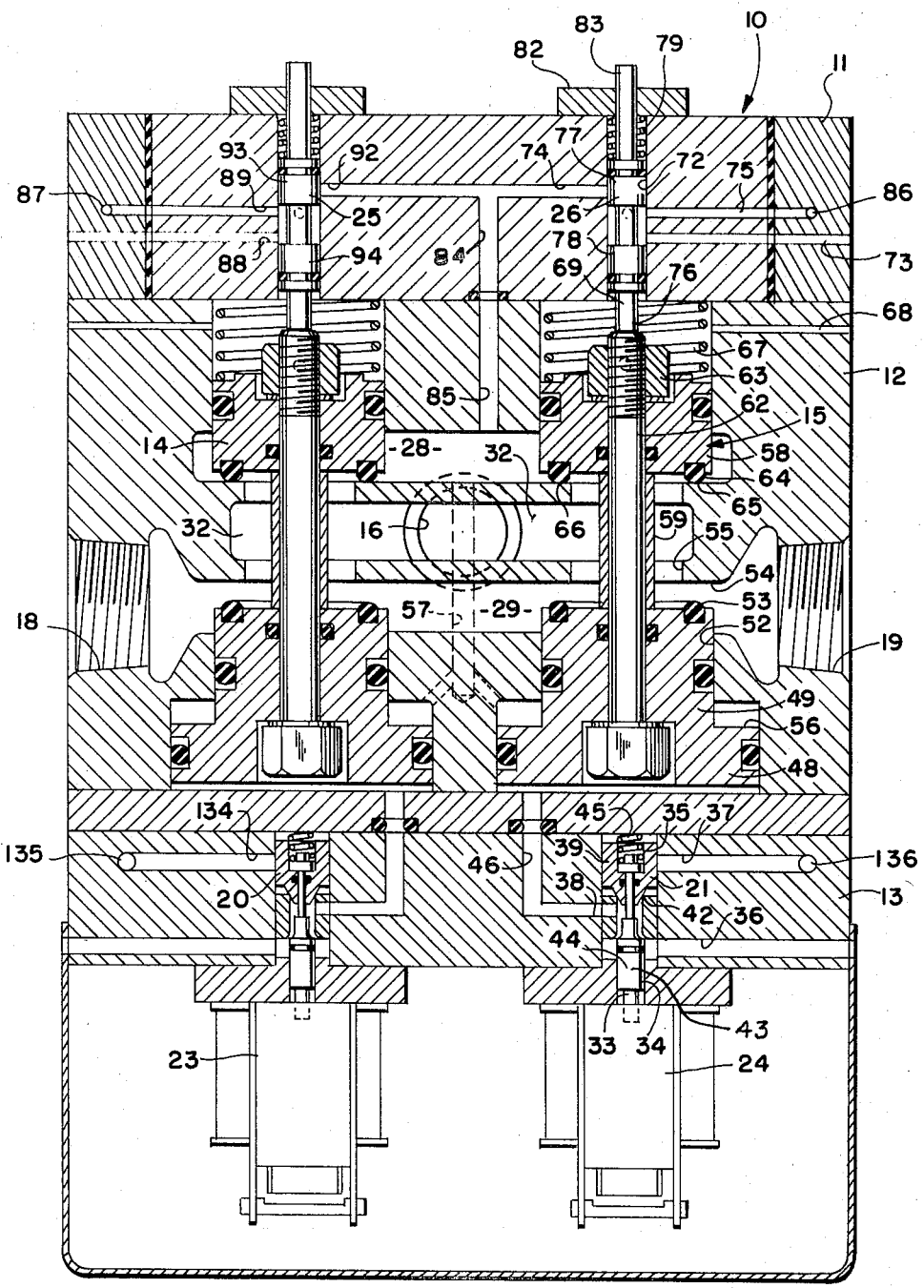
FIG. 2 is an enlarged sectional view taken along the plane of line 2—2 of FIG. 1 showing the position sensor and control valves.

Referring to FIGS. 1, 2 and 3, a fluid pressure control assembly 10 is shown having an upper housing 11, a middle housing 12 and a lower housing 13 fastened together as by screws or other suitable means (not shown). The middle housing 12 contains main valve assemblies 14 and 15 for controlling the flow of fluid under pressure to an outlet port 16 from a supply port 17 and, in addition, controlling the passage of fluid from the outlet port 16 to exhaust ports 18 and 19 in the middle housing 12. The outlet port 16 may be connected to a fluid pressure motor such as a piston-cylinder assembly for actuating a stamping press brake and clutch apparatus (not shown). The supply port 17 may be connected to a source of compressed air such as an air compressor (not shown).

The lower housing 13 contains pilot valves 20 and 21 in communication with the main valve assemblies 14 and 15 and actuated by solenoids 23 and 24. The solenoids 23 and 24 may be connected to a suitable electrical power source and controls for actuation at the desired time.

The upper housing 11 contains position sensor valves 25 and 26 which are actuated by the main valve assemblies 14 and 15 and are in communication with a safety valve 27 to provide a fluid pressure cutoff apparatus for the pressure control assembly 10.

The supply port 17 is in communication with a supply chamber 28 in the middle housing 12 and the exhaust ports 18 and 19 are in communication with an exhaust chamber 29 in the middle housing. An outlet chamber 32 is located between the supply chamber 28 and exhaust chamber 29 in the middle housing 12 with the main valve assemblies 14 and 15 movable into position for opening and closing communication between the outlet chamber and the supply chamber and exhaust chamber.

The valve components consisting of the main valve assembly 14, position sensor valve 25, pilot valve 20 and solenoid 23 are identical with the valve components consisting of the main valve assembly 15, position sensor valve 26, pilot valve 21 and solenoid 24 and accordingly the following description will be directed only to the second-mentioned valve components since this description will also apply to the other valve components.

The solenoid 24 has a shaft 33 in communication with pilot valve member 34 extending upwardly into a bore 35 of pilot valve 21. An exhaust passage 36, inlet passage 37 and outlet passage 38 open on the bore 35 of the pilot valve 21 at spaced-apart positions as shown in FIG. 2. A poppet 39 is slidably mounted on the pilot valve member 34 and is engageable with a seat 42 in the bore 35. The pilot valve member 34 also has an enlarged cylindrical portion 43 for sealing engagement with a restricted orifice 44 in the bore 35. A compression spring 45 is provided at the upper end of the pilot valve member 34 for biasing the valve member downward so that the pilot valve 21 is in a normally closed position with the outlet passage 38 in communication with the exhaust passage 36 through the orifice 44.

When the solenoid 24 is actuated, the pilot valve member 34 is moved upwardly with the cylindrical portion 43 closing the orifice 44 prior to moving the poppet 39 upwardly out of engagement with the seat 42. In this way, communication from the outlet passage 38 to the exhaust passage 36 is interrupted before the fluid pressure is communicated from inlet passage 37 to outlet passage 38 upon movement of the poppet 39 out of engagement with the seat 42.

The outlet passage 38 of the pilot valve 21 is in communication with passage 46 of the main valve assembly 15 in the lower housing 13. The passage 46 communicates fluid pressure to a lower piston 48 of an exhaust valve spool 49 slidably mounted in a vertically extending bore 52 in the middle housing 12. The exhaust valve spool 49 has an upper sealing face 53 for engagement with an exhaust valve seat 54 to close an opening 55 between the exhaust chamber 29 and outlet chamber 32. The lower piston 48 may have a greater diameter than the portion of the spool 49 in sliding engagement with the bore 52 to provide a radially extending annular surface 56 on the upper edges of the piston with an effective pressure surface less than the pressure surface of the lower face of the piston. Pressure fluid is communicated to this annular surface 56 by a passage 57 leading from the supply chamber 28 to the bore 52 at the upper edge of the piston 48.

The exhaust valve spool 49 is connected to a supply valve spool 58 by a sleeve 59 separating the spools and a bolt 62 and nut 63 in threaded engagement with the bolt for holding the spools together. The supply valve spool 58 has a lower sealing face 64 for sealing engagement with a supply valve seat 65 to close an opening 66 between the supply chamber 28 and the outlet chamber 32. A compression spring 67 is located between the upper surface of the supply valve spool 58 and the end of the bore 52 for biasing the main valve assembly 15 downward to close the opening 66 between the supply chamber 28 and the outlet chamber 32 and open the opening 55 between the exhaust chamber 29 and outlet chamber 32 when no fluid pressure is applied to the lower surface of the piston 48 of the exhaust valve spool 49. An exhaust vent 68 is provided in the bore 52 at the upper end of the main valve assembly 15 to facilitate movement of the valve.

The position sensor valve 26 has a valve member 69 slidably movable in a bore 72 extending through the upper housing 11. The bore 72 is in communication with an exhaust passage 73, an inlet passage 74 and an outlet passage 75 located at spaced-apart positions as shown in FIG. 2. The valve member 69 has an extension 76 for engagement with the end of the bolt 62 of the main valve assembly 15 and an upper land 77 and lower land 78 movable into positions for opening and closing the exhaust passage 73, inlet passage 74 and outlet passage 75. A compression spring 79 is located at the top of the position sensor valve 26 between the upper land 77 and a cover plate 82 for biasing the valve member 69 downwardly into engagement with the bolt 62. The valve member 69 may have an indicator pin 83 projecting upwardly through the cover plate 82 to provide a visual indication of the position of the main valve assembly 15 and position sensor valve 26.

Communication between the inlet passage 74 and supply chamber 28 is provided by passages 84 and 85 in the upper housing 11 and middle housing 12. Communication between the outlet passage 75 and one end of the safety valve 27 is provided by passage 86. Communication from an outlet passage 89 of position sensor valve 25 to the other end of the safety valve 27 is provided by a passage 87.

As shown in FIG. 2, with the main valve 15 in the down position the inlet passage 74 is closed by upper land 77 and the outlet passage 75 is in communication with the exhaust passage 73 so that the fluid pressure in the end of the safety valve 27 is at atmospheric pressure to which the exhaust passage is open.

When the main valve assembly 15 is moved upward, the lower land 78 of the position sensor valve 26 will close the exhaust passage 73 and the upper land 77 will be moved to a position opening the inlet passage 74 providing communication to the outlet passage 75 and communicating fluid pressure to the end of safety valve 27 from the supply chamber 28.

The position sensor valve 25 has an exhaust passage 88, the outlet passage 89 and an inlet passage 92 which are in the same position as the exhaust passage 73, inlet passage 74 and outlet passage 75 of the position sensor valve 26. The position sensor valve 25 also has an upper land 93 and a lower land 94 which are in the same position as the upper land 77 and lower land 78 of position sensor valve 26. Accordingly, when the main valve assemblies 14 and 15 are in the same relative positions, the position sensor valves 25 and 26 will be in the same relative positions and the fluid pressure in communication with the the ends of the safety valve 27 will be the same. On the other hand, if the main valve assemblies 14 and 15 are in different positions with one lifted and the other lowered, the fluid pressure in communication with the ends of the safety valve 27 will be different with one end having fluid pressure communicated from the supply chamber 28 and the other end communicating with an exhaust port and being at atmospheric pressure.

Referring to FIG. 3, the safety valve 27 has a bore 95 in the upper housing 11 with end plates 96 and 97 covering the ends and containing the passages 86 and 87 for communicating fluid pressure from the position sensor valves 25 and 26 to the ends of the safety valve 27. A safety valve spool 98 extends longitudinally of the bore 95 and is in slidable sealing engagement with annular shoulders 99 and 102 spaced from the ends of the valve. The annular shoulder 102 may be integral with a sleeve 103 telescopically mounted in a cylindrical cavity 104 at one end of the bore 95.

Figure 5:
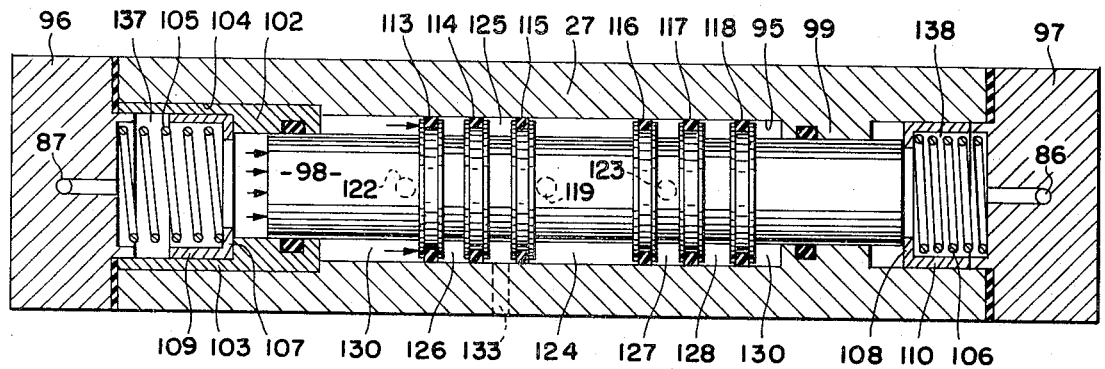
FIG. 5 is a sectional view like FIG. 3 showing the safety valve in a tripped position.

Compression springs 105 and 106 are located in the ends of the bore 95 for engagement with the end plates 96 and 97 and with flanges 107 and 108 on annular retaining rings 109 and 110. The rings 109 and 110 are slidably mounted in the bore 95 between the annular shoulders 99 and 102 and the ends of the bore. The flanges 107 and 108 extend radially inward and have an inner diameter less than the diameter of the safety valve spool 98 so that the springs 105 and 106 are positioned to resiliently resist movement of the safety valve spool from the center position, shown in FIG. 3, to the off-center or side position shown in FIG. 5. With this construction as shown in FIG. 5, the spring 105 does not exert a resilient pressure on the end of the safety valve spool 98 as it is moved to the side position to the right. Also the springs 105 and 106 need not be closely matched to provide centering of the spool 98 because the centering position is determined by the engagement of the rings 109 and 110 with the annular shoulders 99 and 102 and does not depend on the springs being evenly matched.

The safety valve spool 98 has annular lands 113, 114, 115, 116, 117 and 118 at spaced-apart positions along the spool 98 in sealing engagement with the bore 95 between the annular shoulders 99 and 102.

Figure 6:
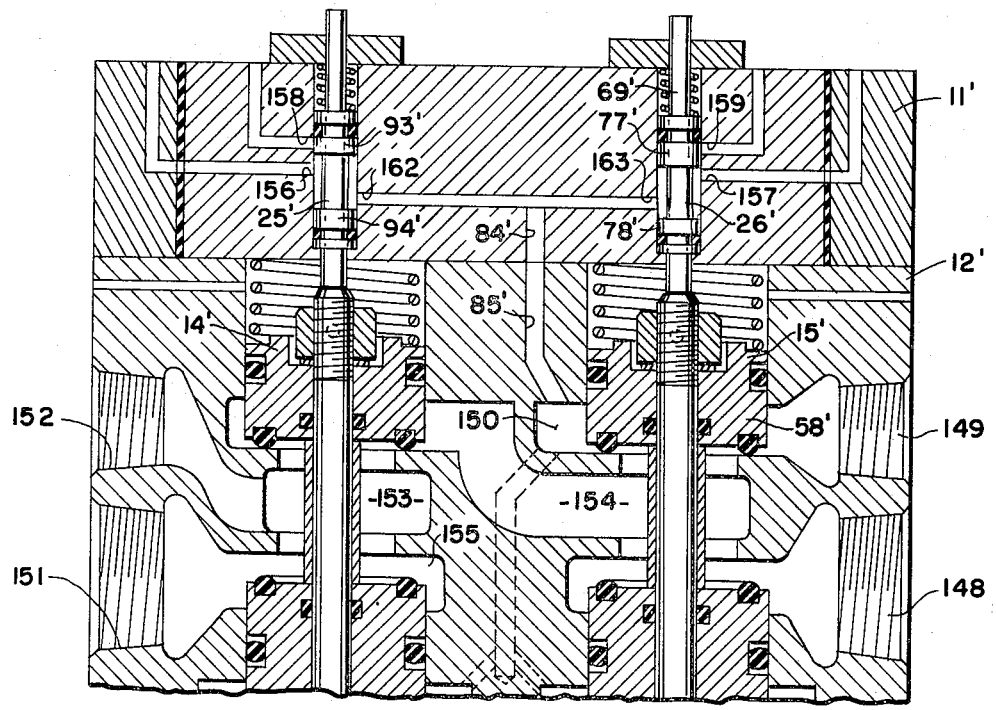
FIG. 6 is a diagramatic view of the apparatus shown in FIGS. 1 and 2 illustrating the fluid pressure connections between the safety valve and the other components of the control apparatus.
Figure 6:
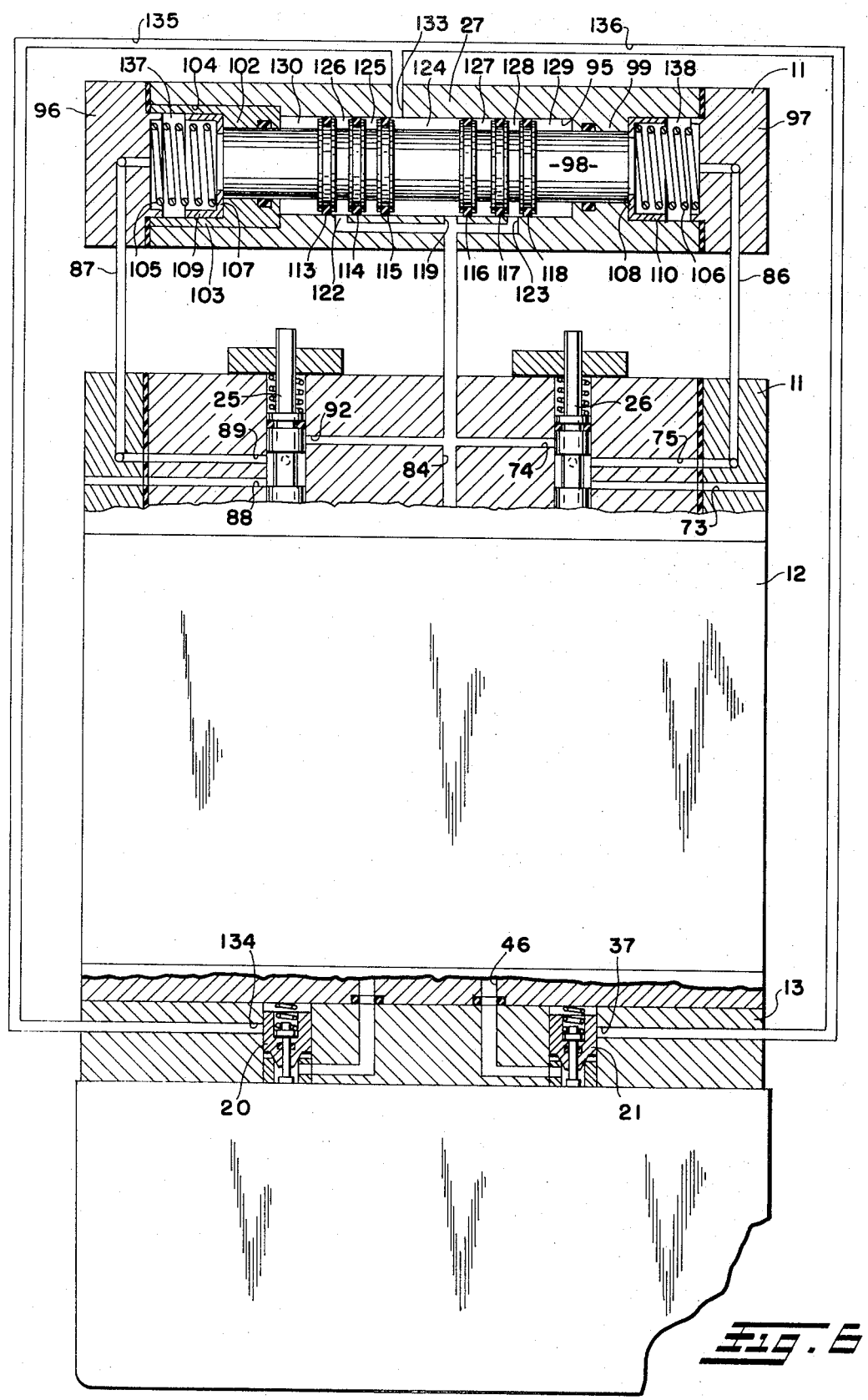

As shown in FIGS. 1, 3, 4 and 5 and diagramatically in FIG. 6, the bore 95 of the safety valve 27 has a central supply inlet passage 119 and side inlet passages 122 and 123 in communication with passages 84 and 85 to communicate fluid under pressure to the bore 95. The land 115 is located on one side and the land 116 is located on the other side of center of the valve 27 providing a central chamber 124. Intermediate chambers 125 and 126 are provided between lands 113, 114 and 115 and intermediate chambers 127 and 128 are provided between lands 116, 117 and 118. Side chambers 129 and 130 are provided between land 118 and annular shoulder 99 and between land 113 and annular shoulder 102.

A central outlet passage 133 in the bore 95 is in communication with the inlet passage 37 of pilot valve 21 and the corresponding passage 134 of pilot valve 20 through passages 135 and 136 extending through the upper housing 11, middle housing 12 and lower housing 13.

As shown more clearly in FIG. 6, with the safety valve spool 98 in the center position, fluid under pressure from the supply chamber 28 is communicated to the central chamber 124 through supply inlet passage 119 and may be communicated from that chamber through the central outlet passage 133 and the passages 135 and 136 to the inlet passages 37 and 134 of pilot valve 21 and 20, respectively. Fluid under pressure is also communicated to intermediate chambers 126 and 128 through side inlet ports passages 122 and 123; however, these chambers are not in communication with any outlet passages and the effective fluid pressure forces exerted are equally balanced out on the lands 117 and 118 and the lands 113 and 114. In the position shown in FIG. 6, the position sensor valves 25 and 26 are in the down position with the inlet passages 92 and 74 closed preventing the communication of fluid pressure to end chambers 137 and 138 of the safety valve 27. The end chambers 137 and 138 are in communication with the outlet passage 89 and exhaust passage 88 of position sensor valve 25 and with the outlet passage 75 and exhaust passage 73 of position sensor valve 26 so that the fluid pressure in the end chambers 137 and 138 is reduced to atmospheric pressure. In this condition, the safety valve spool 98 remains in the centered position and the fluid pressure may be communicated to the inlet passages 37 and 134 of the pilot valves 21 and 20. Accordingly, on actuation of the solenoids 23 and 24, the pilot valves 20 and 21 can communicate fluid under pressure to the main valve assemblies 14 and 15 through outlet passage 46 to open supply opening 66 and the corresponding passage for main valve 14 to transmit fluid under pressure from the supply chamber 28 to the outlet chamber 32 and from there to the fluid pressure motor through outlet port 16.

In the event there is a malfunction of the main valve assemblies 14 and 15 caused by a mechanical failure or foreign particles in the control assembly such that one of the main valve assemblies is in the up position or any increment of the stroke and the other one is in the down position or any increment thereof, this will result in the position sensor valves being out of phase or position relative to each other. For example, if the main valve assembly 14 is stuck in the up position and the main valve assembly 15 returns to the down position, the fluid pressure in end chamber 138 will be vented to the atmosphere through outlet port 75 and exhaust passage 73 resulting in atmospheric pressure in the chamber. On the other hand, the fluid pressure in end chamber 137 at the other end of the safety valve 27 will be increased because position sensor valve 25 will be in the up position closing off exhaust passage 88 and communicating fluid pressure from inlet passage 92 to outlet passage 89 such that the fluid pressure from supply chamber 28 will be communicated to end chamber 137. As shown in FIG. 5, the fluid pressure in end chamber 137 will act against the left end of the safety valve spool 98 biasing the spool against the flange 108 of the ring 110 and compressing the spring 106 as the spool is moved to the right. The central outlet passage 133 will then communicate fluid pressure to intermediate chamber 125 between lands 114 and 115 and accordingly no fluid under pressure will be transmitted to the pilot valves 20 and 21 for operation of the control assembly even though the solenoids 23 and 24 are actuated.

Referring further to FIG. 6, it will be seen that with the safety valve spool 98 in the position shown in FIG. 5, fluid pressure will be transmitted to the side chamber 130, center chamber 124 and to the intermediate chamber 127 by the passages 119, 122 and 123, shown in phantom lines in FIG. 5. The fluid pressure in chambers 124 and 127 will have no effect upon the valve 27 because the forces against lands 115, 116 and 117 will be balanced. On the other hand, the fluid pressure in side chamber 130 will exert a force to the right resulting from the fluid pressure against effective annular area of the land 113. This pressure and the pressure against the effective area at the end of the spool 98 will maintain the spool in a locked position to the right as shown in FIG. 5. Even loss of pressure on the end of spool 98 will not cause the spool to revert to its center position.

In order to release the spool from this locked position, the fluid pressure communicated to the supply chamber 28 must be shut off and the pressure line vented to release the pressure from side chamber 130. When this is done, the spring 106 will urge the ring 110 and the spool 98 to the left as shown in FIG. 5 until the center position is reached.

The operation of the fluid pressure control assembly 10 has been described where there is failure of one of the main valve assemblies 14 or 15. Since the other valve components are all interconnected, the control assembly 10 will operate in substantially the same manner when there is failure of one of the solenoids 23 or 24, one of the pilot valves 20 or 21, or one of the position sensor valves 25 or 26. In every case, the safety valve 27 will be tripped and prevent the flow of fluid under pressure from supply chamber 28 to the pilot valves 20 and 21 and thereby shut down a stamping press or other air-actuated equipment controlled by the assembly 10.

Referring to FIG. 7, a modification of the ends of the safety valve 27 is illustrated with one end only being shown since the other end would be identical. The safety valve 27' has a bore 95' with annular shoulder 99' in which an annular end 139 of the spool 98' is in sealing slidable engagement. A compression spring 106' is located in an end chamber 138' for resiliently engaging an end plate 97' and a retaining ring 110' having a flange 108' for abutting the annular shoulder 99' and the annular end 139 of the safety valve spool 98'. An annular end 139 of the spool 98' has a cylindrical recess 140 in alignment with an axially extending post 141 fastened to the end plate 97' by threaded engagement of one end of the post in a threaded hole 142 in the end plate. The post 141 has an O-ring 143 for sealing engagement with the surface of the recess 140 and is hollow for communication of pressure fluid from the passage 86' to the end chamber 138'. Holes 144 in the wall of the post 141 communicate fluid pressure from inside the post to the end chamber 138'. A central orifice 145 is provided in the end of the post 141 and is normally closed by a ball check valve 146 with a spring 147 holding the ball resiliently in place.

In operation, when the safety valve spool 98' is moved to the right, as shown in FIG. 5, the post 141 enters the recess 140 of the spool and the ball check valve 146 permits air in the recess 140 to escape. The effective area of the annular end 139 upon which the fluid pressure in chamber 138' acts is reduced by the area of the post 141 and accordingly the safety valve spool 98' is further locked in the closed position due to the ball check valve 146 closing the orifice 145 and serving to hold the annular end 139 in an engaged condition. This force, in addition to the pressure against the effective annular area of land 113 and the pressure against the opposite end of the spool 98', effectively locks the spool in the closed position until the fluid pressure is released and vented.

Referring to FIG. 8, a further modification is shown in which the main valve assemblies 14' and 15' are arranged in series instead of in parallel as shown in the embodiment of FIGS. 1 through 6. The middle housing 12' has two exhaust ports 148 and 151, and the supply port 149 is only in communication with supply valve spool 58' and a supply chamber 150. The outlet port 152 is in communication with an outlet chamber 153 in communication with main valve assembly 14'. A supply passage 154 is provided between the main valve assembly 15' and main valve assembly 14' for conveying fluid under pressure from the main valve assembly 15' to the main valve assembly 14'. An exhaust passage 155 is provided for communicating exhaust fluid from outlet port 152 to exhaust port 151. With this construction, actuation of the solenoids 23' and 24' (not shown) and the pilot valves 20' and 21' (not shown) lifts the main valve assemblies 14' and 15' providing communication between the supply port 149 and the supply passage 154 for passage of the fluid from main valve assembly 15' to main valve assembly 14'. Communication is also provided by the lifting of main valve assembly 14' for the passage of fluid from the supply passage 154 to the outlet chamber 153. Fluid under pressure is then communicated through the outlet port 152 to an appropriate fluid pressure motor.

With the main valve assemblies 14' and 15' in the down position, as shown in FIG. 8, communication is provided between the outlet port 152 and the exhaust passage 155 by valve assembly 14' and then from the exhaust passage 155 to the exhaust port 151. Communication is also provided between the supply passage 154 and the exhaust port 148 by valve assembly 15'.

Referring now to the position sensor valves 25' and 26', outlet passages 156 and 157 are in communication with the bores of the valves and with chambers 137' and 138' of the safety valve 27' (not shown). Exhaust passages 158 and 159 are in communication with the bores of the valves 25' and 26' and with atmospheric pressure outside the upper housing 11'. Inlet passages 162 and 163 are in communication with a source of pressure fluid at the supply port 149 and supply chamber 150 through passages 84' and 85'. The valve member 69' of position sensor valve 26' has an upper land 77' which in the lower position, shown in FIG. 8, closes exhaust passage 159. Lower land 78' on valve member 69' opens the inlet passage 163 in the lowered position of the main valve assembly 15' permitting communication of the inlet passage with the outlet passage 157 and thereby providing a normally open valve in which fluid pressure is communicated to the chamber 138' of the safety valve 27'. In the same manner, the upper land 93' closes the exhaust passage 158 and the lower land 94' is located so that the inlet passage 162 is in communication with the outlet passage 156 and fluid pressure is communicated to the end chamber 137' whereupon the safety valve spool 98' is maintained in the centered position by the normally open position sensor valves.

In operation, the main valve assembly 15' is subjected to fluid pressure prior to main valve assembly 14' and this fluid pressure may lift the main valve assembly 15' ahead of the main valve assembly 14'. This advance movement of main valve assembly 15' is compensated for by locating the lands 78' and 77' on the valve 26' at lower positions than the lands 93' and 94' of the position sensor valve 25'. This advance movement of main valve assembly 15' may alternatively be compensated for by positioning the inlet passage 163 of position sensor valve 26' higher than the inlet passage 162 of position sensor valve 25' so that the relative position of these passages and the lands 78' and 94' will be the same as for the construction shown in FIG. 8. The exhaust passages 158 and 159 may also be positioned with the passages of position sensor valve 26' lower than the passage of position sensor valve 25' to provide the same relative positions of the lands 77' and 93' with respect to these passages as is provided in the construction shown in FIG. 8. Accordingly, with this programming both the inlet ports 162 and 163 can be closed simultaneously and both the exhaust ports 158 and 159 can be opened simultaneously to provide the same fluid pressure in end chambers 137' and 138' of the safety valve 27'.

Likewise, when the main valve assemblies 14' and 15' are lowered, main valve assembly 15' may move down at a slightly slower rate than main valve assembly 14' and this difference in the positioning of the lower land 78' and the lower land 94' will permit simultaneous communication of fluid pressure to the end chambers 137' and 138'.

However, due to the fact that pilot valves 20' and 21' are supplied simultaneously with fluid pressure via passages 135 and 136, the relative positions of the position sensor lands may not be critical because both main valve assemblies 14' and 15' move almost simultaneously and the position sensors 25' and 26' also move simultaneously.

In the event there is a malfunction of one of the valve components such that one of the main valve assemblies 14' or 15' is in the up position and the other is in the down position, this will result in one of the position sensor valves 25' or 26' being in an up position and the other being in a down position. Consequently the fluid pressure in the end chambers of the safety valve 27' will be different causing movement of the spool 98' to a side position as shown in FIG. 5. The flow of fluid under pressure to the pilot valves 20' and 21' will be cut off and actuation of solenoids 23' and 24' will not actuate the main valve assemblies 14' and 15' causing the fluid supply to be cut off.

The preferred embodiment of the control assembly 10 has included a tied piston-poppet type of valve assembly; however, the position sensor valves and safety valves of this invention may also be effectively used with loose or sliding fit piston-poppet type valve assemblies. In addition, the construction of the invention may be effectively used with balanced spool valves.

While a certain representative embodiment and certain modifications have been shown for the purpose of illustrating the invention, it will be apparent to those skilled in the art that other changes and modifications may be made therein without departing from the spirit or scope of the invention.

I, therefore, particularly point out and distinctly claim as my invention:

1. A fluid pressure cutoff apparatus comprising a housing, a bore extending from one end of said housing to the other end, a spool slidably mounted in said bore for movement axially of said bore between a central position and side positions, said bore having annular shoulders spaced from the ends of said bore forming end chambers and supporting said spool, centering means for resiliently holding said spool in a centered position, fluid supply passages connected to said end chambers for communicating with separate valve means, said spool having ends extending into said end chambers and having the same effective end areas subjected to fluid pressure whereby said spool is biased from a central position to one of said side positions when the fluid pressure in one of said end chambers exceeds the fluid pressure in the other of said end chambers by a force exceeding the resilient force of said centering means, said spool having annular lands in sealing engagement with said bore at positions between said annular shoulders dividing the space between said spool and said bore into a central chamber and side chambers, a central inlet passage in communication with said bore for admitting fluid into said central chamber and a central outlet passage for communicating fluid out of said central chamber with said spool in said central position and for cutting off communication of said fluid out of said central chamber when said spool is displaced into one of said side positions, side inlet passages located in communication with said bore between said annular shoulders and said central inlet passage for communicating fluid under pressure into one of said side chambers when said spool is in a side position whereby fluid pressure acts against the effective area of one of said annular lands of said spool to supplement the force on said spool ends biasing said spool and locking said spool in the side position.

2. A fluid pressure cutoff apparatus according to claim 1 wherein said centering means includes annular rings disposed in said end chambers having flanges engageable with said annular shoulders and overlapping the ends of said spool and compression springs disposed in said end chambers with one end of each of said springs engaging the end of said housing and the other end of said springs engaging one of said annular rings to resist movement of the spool from a centered position and limit the movement of said springs.

3. A fluid pressure cutoff apparatus according to claim 1 wherein each of said end chambers has an axially extending post and said ends of said spool have recesses for receiving said posts when said spool is moved into one of said side positions whereby the effective end area subjected to fluid pressure in said end chambers is reduced to further lock said spool in the side position.

4. A fluid pressure cutoff apparatus according to claim 3 wherein said centering means includes annular rings having flanges engageable with said annular shoulders and overlapping the ends of said spool and compression springs disposed in said end chambers with one end of each of said springs engaging the end of said casing and the other ends of said springs engaging one of said slidable annular rings to resist movement of the spool from a centered position and limit the movement of said springs.

5. A fluid pressure cutoff apparatus according to claim 1 wherein said separate valve means includes a pair of position sensor valves in communication with a common fluid pressure source, each of said position sensor valves having a fluid passage for communicating fluid pressure to one of said end chambers, each of said position sensor valves having an exhaust passage and slidable valve means for communicating fluid pressure to one of said end chambers in response to the positioning of said valve means.

6. A fluid pressure cutoff apparatus comprising a housing, a bore extending from one end of said housing to the other end, a spool slidably mounted in said bore for movement axially of said bore between a central position and side positions, said bore having end chambers, centering means for resiliently holding said spool in a centered position, fluid supply passages in communication with said end chambers for communicating fluid pressure from separate position sensor valves, said spool having ends extending into said end chambers and having the same effective end areas subjected to fluid pressure, said spool having annular lands in sealing engagement with said bore at positions between said end chambers dividing the space between said spool and said bore into a central chamber and side chambers, a central inlet passage in communication with said housing for communicating fluid under pressure into said central chamber and a central outlet passage in communication with said central chamber for communicating fluid under pressure out of said central chamber with said spool in a central position and for cutting off communication of said fluid under pressure out of said central chamber when said spool is displaced into one of said side positions, each of said position sensor valves having an inlet passage in communication with a common fluid pressure source and an outlet passage in communication with one of said end chambers, said pressure sensor valves having exhaust passages and valve means for communicating fluid under pressure to said end chambers in one position of said valve means and exhausting fluid from said end chambers in another position of said valve means whereby the pressure in said end chambers is maintained equally when said valve members of said pressure sensor valves are in the same relative positions and the pressure in one of said end chambers is greater than the pressure in the other of said end chambers when the valve member of one of said pressure sensor valves is in a different position from the valve member of the other of said pressure sensor valves.

7. A fluid pressure cutoff apparatus according to claim 6 wherein said valve members of said position sensor valves have lands located in positions for closing said exhaust passages and with said inlet passages and outlet passages being in communication to communicate fluid pressure to said end chambers in the normal condition of said cutoff apparatus.

8. A fluid pressure cutoff apparatus according to claim 6 wherein said valve members of said position sensor valves have lands located in positions for closing said inlet passages and with said outlet passages and said exhaust passages being in communication to communicate fluid pressure to said end chambers in the normal condition of said cutoff apparatus.

9. A fluid pressure cutoff apparatus according to claim 6 wherein said valve members of said position sensor valves have lands for opening and closing said inlet passages, outlet passages and exhaust passages, said lands of one of said valve members being offset from the lands of the other of said valve members for controlling the communication of fluid pressure to said end chambers to maintain said spool in a centered position where one of said valve members normally moves before the other of said valve members and it is necessary to compensate for this advance movement.

10. A fluid pressure cutoff apparatus according to claim 6 wherein said valve members of said position sensor valves have lands for controlling the communication of fluid pressure between said inlet passages, outlet passages and exhaust passages, the positioning of said lands relative to the positions of said passages in communication with one of said position sensor valves being different from the positioning of said lands relative to the positions of said passages in communication with the other of said position sensor valves to provide for controlling the communication of fluid pressure to said end chambers to maintain said spool in a centered position where one of said valve members normally moves before the other of said valve members and it is necessary to compensate for this advance movement.

11. A fluid pressure cutoff apparatus according to claim 6 wherein said valve members of said position sensor valves have lands for controlling the communication of fluid pressure between said inlet passages, outlet passages and exhaust passages, said passages of one of said position sensor valves being offset from said passages of the other of said position sensor valves for controlling the communication of fluid pressure to said end chambers to maintain said spool in a centered position where one of said valve members normally moves before the other of said valve members and it is necessary to compensate for this advance movement.

* * * * *